United States Patent [19]

Barrett

[11] Patent Number: 4,937,447

[45] Date of Patent: Jun. 26, 1990

[54] AIR TURBULENCE DETECTION

[75] Inventor: Joseph J. Barrett, Morris Plains, N.J.

[73] Assignee: Allied-Signal Inc., Morris Township, Morris County, N.J.

[21] Appl. No.: 316,371

[22] Filed: Feb. 24, 1989

[51] Int. Cl.$^5$ ................................................ G01J 1/00
[52] U.S. Cl. .................................. 250/339; 250/338.1; 250/338.5
[58] Field of Search .................... 250/338.1, 338.5, 339

[56] References Cited

U.S. PATENT DOCUMENTS

| | | | |
|---|---|---|---|
| 3,359,557 | 12/1967 | Fow et al. | 342/351 |
| 3,380,055 | 4/1968 | Fow et al. | 342/351 |
| 3,389,256 | 6/1968 | Astheimer | 250/339 X |
| 3,475,963 | 11/1969 | Astheimer | 250/338.5 X |
| 3,501,641 | 3/1970 | Krause | 250/338.5 X |
| 3,735,136 | 5/1973 | Flint | 250/339 |
| 3,780,293 | 12/1973 | Flint | 250/339 |
| 3,935,460 | 1/1976 | Flint | 250/349 |
| 4,266,130 | 5/1981 | Kuhn | 250/339 |
| 4,390,785 | 6/1983 | Faulhaber et al. | 250/338.5 X |
| 4,427,306 | 1/1984 | Adamson | 374/128 |

OTHER PUBLICATIONS

Kuhn et al., "Clear Air Turbulence: Detection by Infrared Observations of Water Vapor", *Science*, vol. 196, 6/77, pp. 1099–1100.

Max et al., "A PbSe Diode Laser Spectometer to be Used in Air Pollution Monitoring and Mineral Prospecting", *Optical and Quantum Electronics*, No. 5, 9/77, pp. 411–418.

Norman et al., "Remote Detection of Clear Air Turbulence by Means of an Airborne Infrared System", *AIAA Paper*, No. 65-459, 7/65, pp. 1–28.

R. W. Astheimer, "The Remote Detection of Clear Air Turbulence by Infrared Radiation", Appl. Optics, 9, p. 1789, (1970), vol. 9, No. 8.

*Primary Examiner*—Constantine Hannaher
*Assistant Examiner*—J. Eisenberg
*Attorney, Agent, or Firm*—Gerhard H. Fuchs; Richard C. Stewart; Ernest D. Buff

[57] ABSTRACT

Air turbulence (windshear as well as clear air turbulence) in navigable airspace is detected by remotely sensing changes in the spatial temperature profile of an air column ahead of an aircraft by repeatedly sensing the intensity of the thermal radiation from the column of atmospheric air in at least two spectral peaks in the 4.17 to 4.2 μm region of the $CO_2$ spectral emission band, and comparing the relative intensity of the spectral peaks over time. Apparatus which includes a tunable Fabry-Perot etalon is provided for the practice of the method.

10 Claims, 11 Drawing Sheets

AIR TURBULENCE DETECTION

BACKGROUND OF THE INVENTION

This invention relates to the field of remote passive detection of air temperature gradients to provide early warning to aircraft of clear air turbulence and wind shear conditions.

Remote sensing of air temperature gradients is a known means for detecting air turbulence conditions, such as clear air turbulence and wind shear. Both of these conditions can pose serious hazards to aerial navigation. Generally, known procedures involve sensing the infrared radiation in a column of air ahead of the aircraft to determine changes in the spatial temperature profile which are associated with aerial turbulence, as described by R. W. Astheimer in "The Remote Detection of Clear Air Turbulence by Infrared Radiation", Appl. Optics, 9 (1970) 1789. This has involved detection of radiation in the 13 to 14.5 $\mu$m $CO_2$ regions by means of Fabry-Perot interferometers, as described by Astheimer. Others have proposed similar systems utilizing $CO_2$ radiation in the 13 to 15.5 $\mu$m band (U.S. Pat. Nos. 3,735,136, 3,780,293, and 3,935,460, all to Flint); in the 27 to 33 $\mu$m water vapor band (U.S. Pat. No. 4,266,130 to Kuhn, and U.S. Pat. No. 4,427,306 to Adamson); or radiation from oxygen molecules (U.S. Pat. No. 3,359,557 and 3,380,055, both to Fow et al.).

It is also known to sense radiation at different freqencies to obtained depths-temperature profiles (see for example U.S. Pat. No. 3,380,055 to Fow et al., and the aforementioned Astheimer article). This is based on the observation that strong spectral bands will have high emission but also high absorption, hence will provide information only at close ranges since radiation originating at longer ranges will be strongly absorbed. Conversely, weak bands with low absorption and low emission allow probing at longer ranges. Therefore, by comparing observations at different wavelengths representing relatively stronger and weaker bands, one can observe changes over time in the temperature profile in the column of air.

Prior art remote temperature sensing methods had used relatively coarse (wide spectral bandwidth) interference filters, which mass many spectral lines, to isolate spectral regions with weak absorption in an attempt to obtain range information. Accurate range information could not be obtained by these instruments because the coarse interference filters transmit spectral lines of interfering gases, such as water vapor and ozone, whose concentrations were unknown and variable.

I have more fully investigated the atmospheric transmission and radiance (emission) for the two infrared bands of naturally occurring carbon dioxide in the 13 to 15 $\mu$m region, and in the 3 to 5 $\mu$m region, more specifically the 4 to 4.5 $\mu$m region. I have found that for a temperature of about 300 K. the radiation at the 4.2 $\mu$m band is about an order of magnitude less than the 14 $\mu$m band, but that the 4.2 $\mu$m band is about three times more sensitive to temperature changes than the 14 $\mu$m band. Furthermore, in the 4.15 to about 4.2 $\mu$m spectral region, one finds mainly the regularly spaced $CO_2$ lines free of interfering spectral lines of nitrous oxide, methane, ozone, and water vapor. Indeed, within this spectral region the nitrous oxide and methane spectral lines are three orders of magnitude weaker than the $CO_2$ lines, while the water vapor emission in this region is five orders of magnitude weaker. Thus, by tuning a radiometer to different spectral lines in the shorter wavelength $CO_2$ band when observing the radiation obtained from an air column, data as a function of range can be obtained with the weaker spectral lines providing information at longer ranges.

SUMMARY OF THE INVENTION

Accordingly, the present invention provides apparatus for remotely sensing changes in the temperature profile of a column of atmospheric air, which apparatus includes means for receiving thermal radiation from a column of atmospheric air and for directing it to intensity sensing (radiometer) means which are capable of sequentially sensing the intensity in the column of atmospheric air of at least two spectral peaks in the 4.17 to 4.2 $\mu$m region of the $CO_2$ spectral emission band, and means for detecting temporal changes in the relative intensity of these spectral peaks. Changes of the relative intensity of the spectral peaks indicate a change in the temperature gradient within the column of atmospheric air, which change is indicative of air turbulence, such as clear air turbulence or wind shear.

This invention further provides a method for remotely sensing changes in the spatial temperature profile of a column of atmospheric air which involves repeatedly sensing the intensity of the thermal radiation from the column of atmospheric air in at least two spectral peaks in the 4.17 to 4.2 $\mu$m region of the $CO_2$ spectral emission band and comparing the relative intensity of said spectral leaks over time.

The column of atmospheric air may be a column ahead of a moving aircraft, as when the radiation sensor device is utilized on an operating aircraft to provide early warning of clear air turbulence or wind shear; it may also be stationary (ground installed), for example at an airport, to determine temperature gradient changes indicative of wind shear in the paths of approaching or departing aircraft.

BRIEF DESCRIPTION OF THE DRAWINGS

The present invention may be better understood with reference to the annexed drawings, wherein.

DETAILED DESCRIPTION OF THE INVENTION

Figure 1:
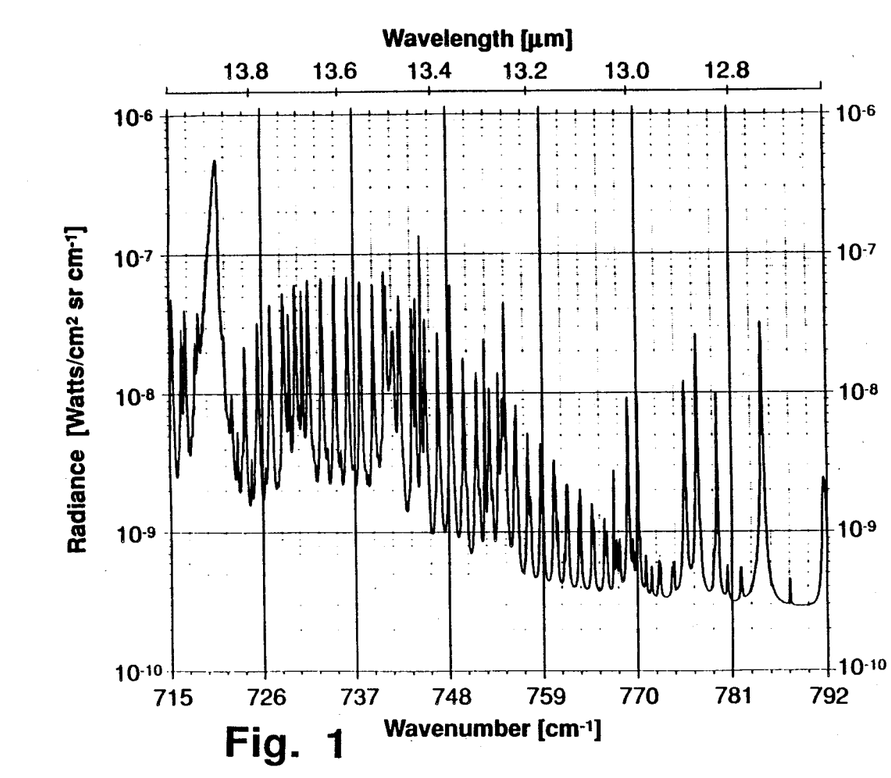
FIG. 1 is a plot of the atmospheric emission from the short wavelength side of the $CO_2$ 15 $\mu$m band, computer generated for a 1 m horizontal path at an altitude of 0.5 km.

The FASCODE atmospheric computer model was used to generate plots of atmospheric transmission and radiance for two infrared bands of naturally occurring carbon dioxide gas. FASCODE (Fast Atmospheric Signature CODE) is a computer program which calculates spectral transmission and radiance of the atmosphere with high spectral resolution. The program was developed by the Air Force Geophysics Laboratory. It utilizes the high-resolution transmission molecular absorption (HITRAN) database which contains information on seven principal atmospheric absorbers and twenty one additional molecular species. The program can be used for any atmospheric slant path geometry and is applicable to spectral regions from the microwave to the near ultraviolet. It is available through DOC-NOAA-NCDC, National Climatic Data Center, Federal Building, Ashville, NC 28801-2696 A plot of the emission from the short wavelength side of the $CO_2$ 15 $\mu m$ band is shown in FIG. 1. This plot was generated for a one meter horizontal path at an altitude of 0.5 km. The $CO_2$ band in the vicinity of 15 $\mu m$ has previously been utilized for detecting wind shear and clear air turbulence. The use of the FASCODE program showed that there was significant interference from water vapor and ozone within the passbands of the spectral filters used in the prior art. The use of these broad spectral filters could lead to erroneous results, since water vapor and ozone densities are variables which depend on atmospheric conditions.

Figure 2:
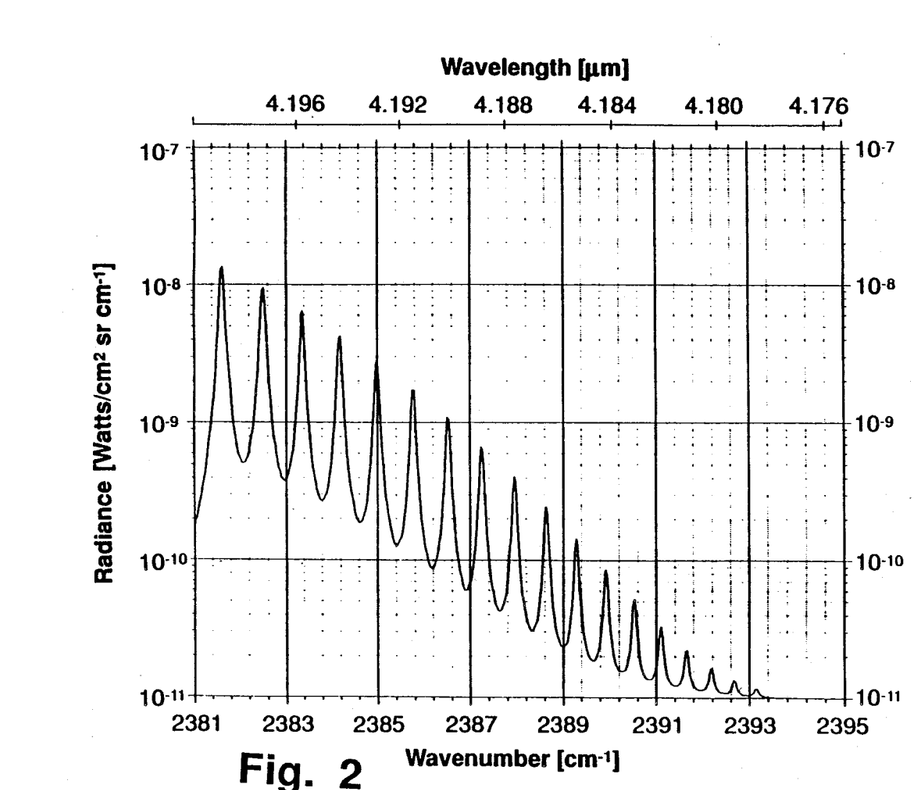
FIG. 2 is a plot of the atmospheric emission from the 4.2 $\mu$m region of the $CO_2$ band, computer generated for a 1 m horizontal path at an altitude of 0.5 km.

A similar plot for the 4.2 $\mu m$ region was also generated, and it is shown in FIG. 2. The spectral lines in this plot are due to emission from carbon dioxide in the atmosphere. Interfering spectral lines due to nitrous oxide and methane are three orders of magnitude weaker than the $CO_2$ lines, while water vapor emission in this region is five orders of magnitude weaker.

Figure 3:
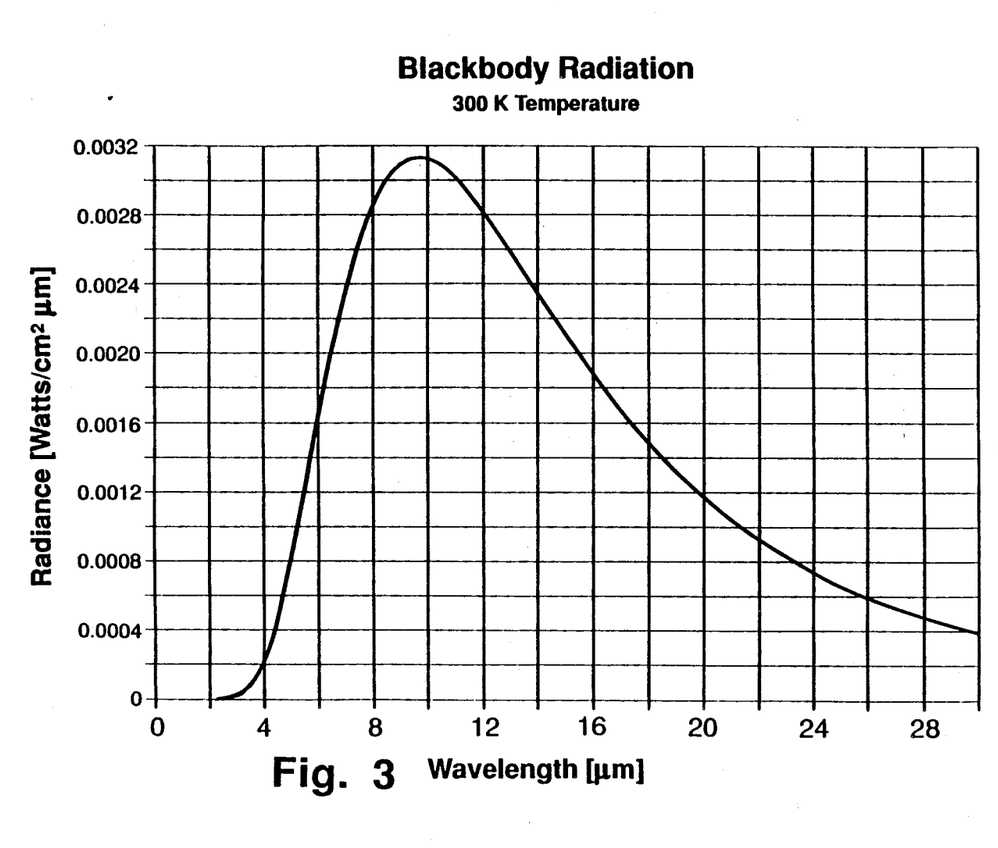
FIG. 3 is a curve of the intensity of blackbody radiation at 300 K. for the spectral region up to 30 $\mu$m.
Figure 4:
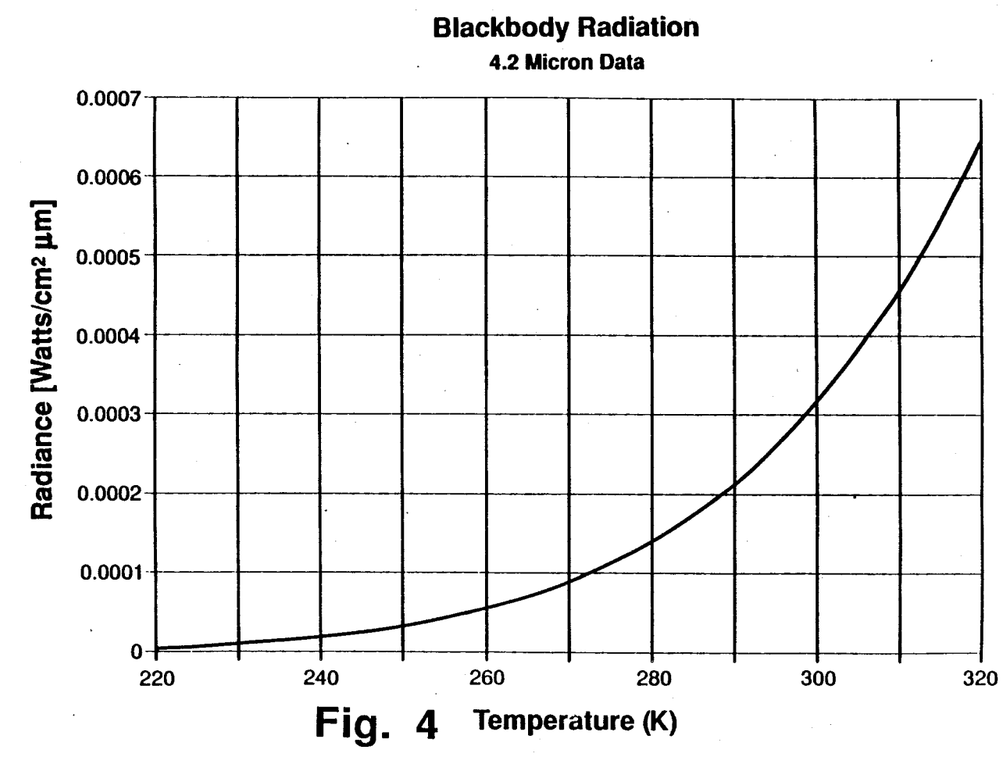
FIG. 4 is a curve showing temperature dependence of blackbody radiation in the 4.2 $\mu$m region.
Figure 5:
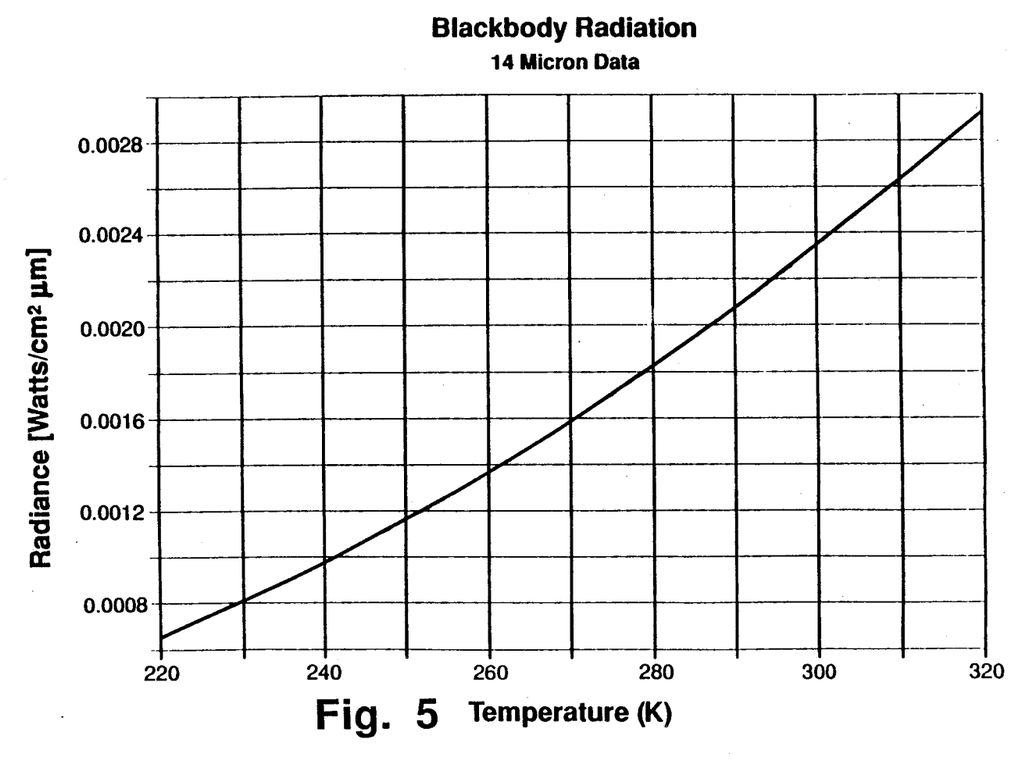
FIG. 5 is a curve showing temperature dependence of blackbody radiation in the 14 $\mu$m region.

The blackbody emission from the 4.2 $\mu m$ region is weaker than that from the 15 $\mu m$ region for a temperature of 300 K. . The spectral distribution of blackbody radiation was calculated using Planck's function, and is shown in FIG. 3 for a 300 K. temperature sample. This figure shows that the blackbody radiation from the 13 $\mu m$ region is about one order of magnitude greater than the corresponding radiation from the 4.2 $\mu m$ region. The variation of blackbody radiation with temperature was calculated for two wavelengths, 4.2 $\mu m$ and 14 $\mu m$. The results are shown in FIGS. 4 and 5. The blackbody radiation at the 4.2 $\mu m$ band is about three times more sensitive to temperature changes than the 14 $\mu m$ band. Since the passive radiometric temperature sensing technique is based on the detection of small changes in atmospheric temperature, the use of the 4.2 $\mu m$ band is more desirable. In addition, the 4.2 $\mu m$ band is not complicated by the presence of interfering gases.

Figure 6:
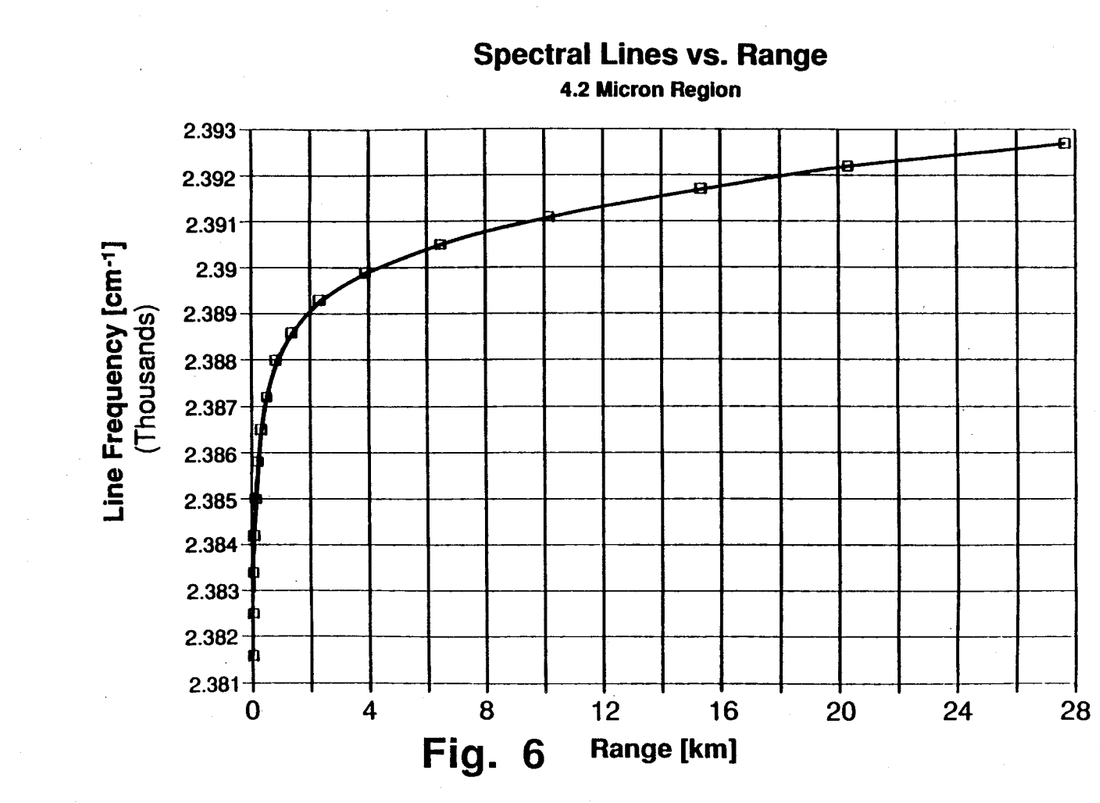
FIG. 6 is a plot of the maximum range values for the individual $CO_2$ spectral lines in the 4.2 $\mu$m region.

The maximum range values of the individual spectral lines in the 4.2 $\mu m$ carbon dioxide band are shown in FIG. 6. The lines which have the smaller absorption coefficients are associated with the longer ranges, whereas the stronger emission/absorption lines provide information at shorter ranges. Therefore, by tuning the spectral window of the radiometer over many emission/absorption lines with varying strengths, information as a function of range can be obtained. This is an important feature which makes it possible to achieve the remote detection of wind shear and clear air turbulence conditions.

Figure 7:
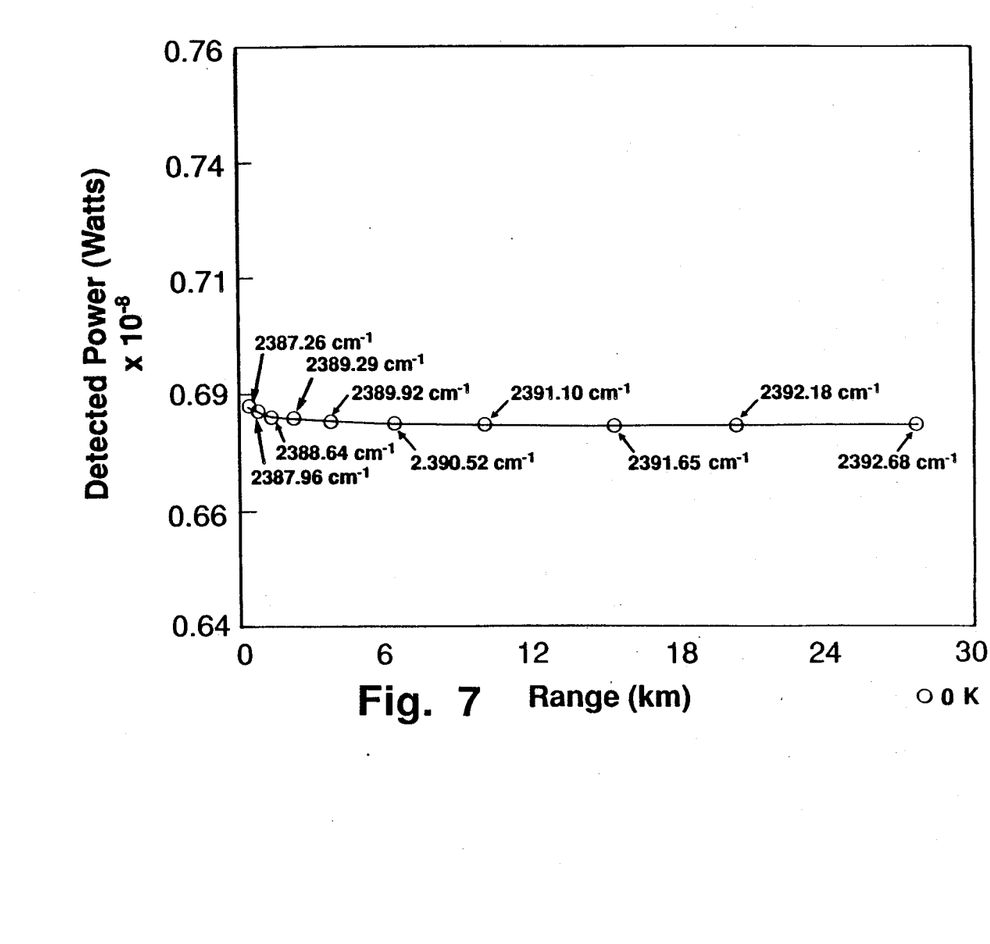
FIG. 7 is a plot of detected radiometer power for different indicated wavelengths as a function of range in the absence of a temperature discontinuity, calculated for a temperature of 270.45 K. at 0.5 km altitude for a radiometer view angle of 0.43 degrees.

A plot depicting the detected radiometer power for different wavelengths as a function of range when there is no temperature discontinuity in the field of view is shown in FIG. 7. This data was calculated for a mid-latitude winter atmospheric model at an altitude of 0 5 km where the temperature is 270.45 K. The field of view of the radiometer was 0.43 degrees.

An interesting result of this calculation is that the detected radiometer power remains almost constant as the range increases. This is due to the integration of the emission from the weak lines over longer path length.

Figure 8:
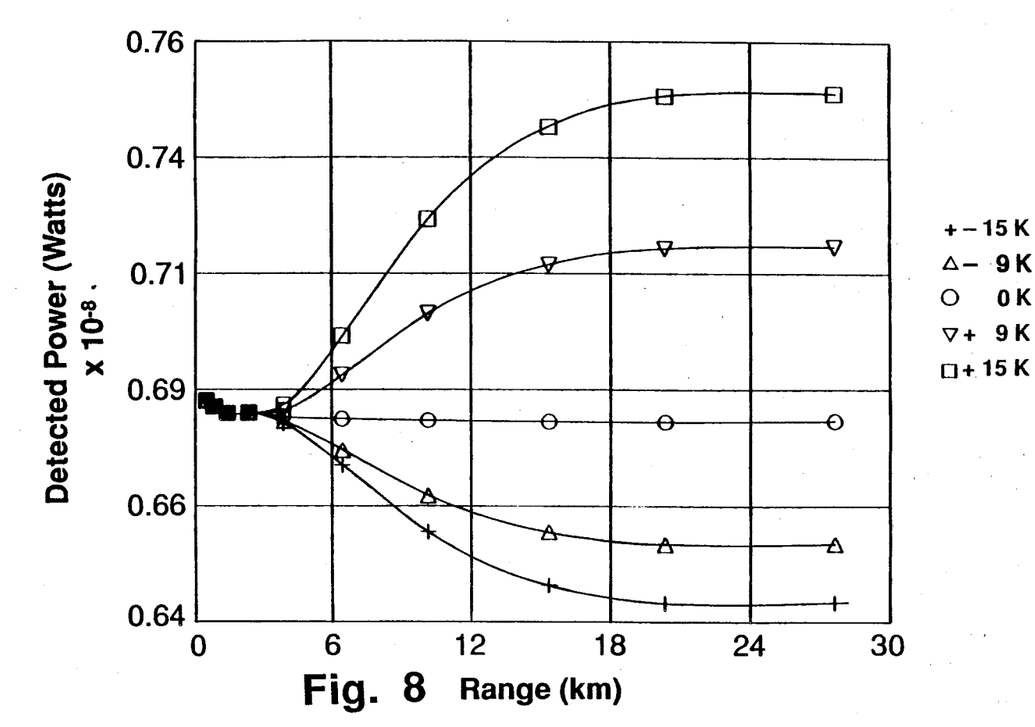
FIG. 8 is a plot of detected radiometer power under the same conditions as in FIG. 7, except for the introduction of temperature discontinuities beginning at a range of 3 km and occurring over a 1 km path length, representing temperature change of 9 K. and 15 K. above and below the average temperature of 270.45 K.
Figure 9:
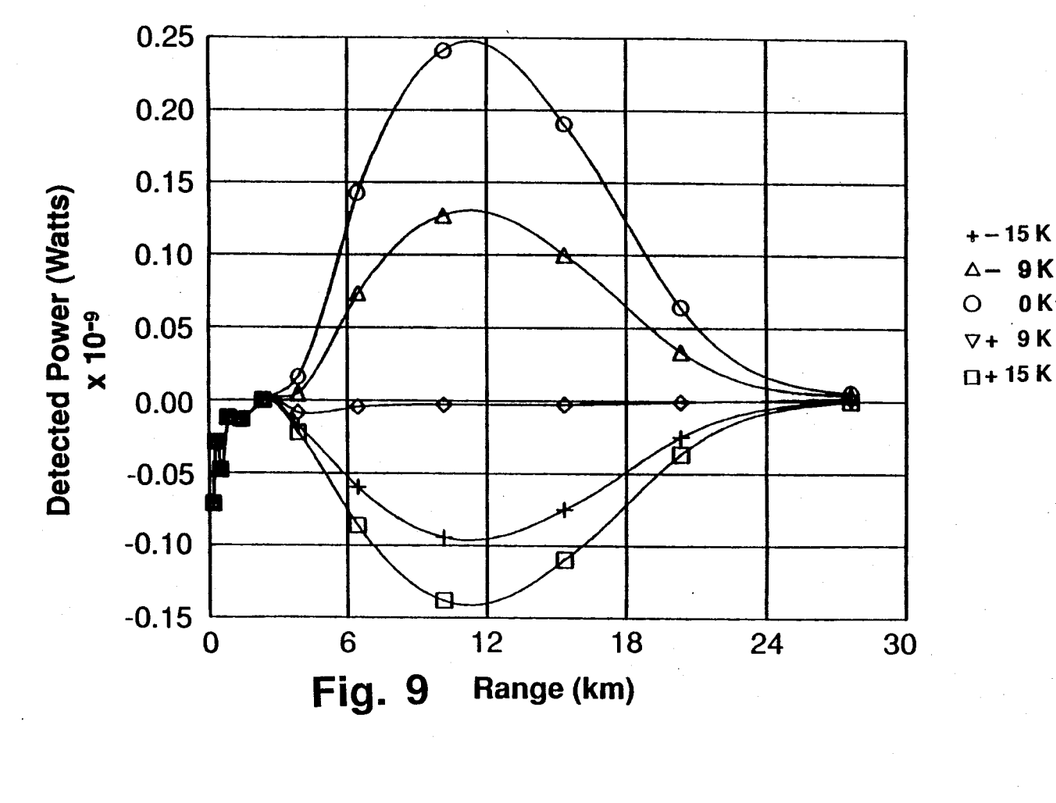
FIG. 9 illustrates a graphic means for representing and analyzing the range data shown in FIG. 8, by plotting the difference in the radiometer readings for different ranges.

The results for temperature discontinuities beginning at a range of 3 km are shown in FIG. 8. Curves for temperature changes of 9 and 15 K. above and below the average temperature of 270.45 K. are shown in this figure. The temperature discontinuities occur over a 1 km path length. This computed data indicates that the radiometer is quite sensitive to atmospheric temperature changes which would signal the presence of wind shear conditions. A convenient way of analyzing the radiometric data involves determination of the difference between the signals at different ranges, as is illustrated in FIG. 9 with reference to computed data involving arbitrarily chosen temperature changes of $\pm 9$ and $\pm 15$ K. occurring at a range of 3 km over a 1 km path. Range data is obtained by tuning the radiometer to different spectral emission lines of $CO_2$ in the 4.17 to 4.2 $\mu m$ region. The detector signal from a given spectral line is then substracted from the detector signal for the next spectral line at the longer range. The resultant difference is recorded as a function of range. The results are shown in FIG. 9, wherein a spline curve fit was used to generate the smooth curves. The curves are for temperature changes of 9 and 15 K. above and below the chosen average temperature of 270.45 K. Similar curves are obtained at other average base temperatures, and for other temperature discontinuities.

Other ways of representing and analyzing the observed range data will readily occur to those skilled in the art.

The components required for the construction of the apparatus of the present invention are of conventional design and function, and they are commercially available. The apparatus is further described with reference to FIG. 10. The apparatus includes optical means for receiving the thermal radiation from a column of atmospheric air and for directing it to intensity sensing means. The optical means suitably includes a pair of spherical concave (2) and convex (3) mirrors having gold coated surfaces. Infrared radiation (1) from the column of atmospheric air which is being observed is focussed by means of concave mirror (2) onto convex mirror (3) to produce a beam of collimated, or nearly collimated, infrared radiation (4), which is passed through infrared filter (5) to a Fabry-Perot interferometer (6). infrared filter (5) is a blocking filter for transmitting only a small spectral region of the carbon dioxide band. Suitably, it has a spectral bandwidth of 0.05 μm with a center wavelength of 4.227 μm and a peak transmission of about 72 percent. Such blocking filters are standard items of commerce; they are available, for example, from Optical Coating Laboratory, Inc., of Santa Rosa, Calif. The $CO_2$ spectral lines which are to be measured are within the range of 2381 to 2395 cm$^{-1}$. Filter (5) suitably is an interference filter. Its transmission characteristics can be varied by changing its angular position relative to the incident radiation.

Figure 11:
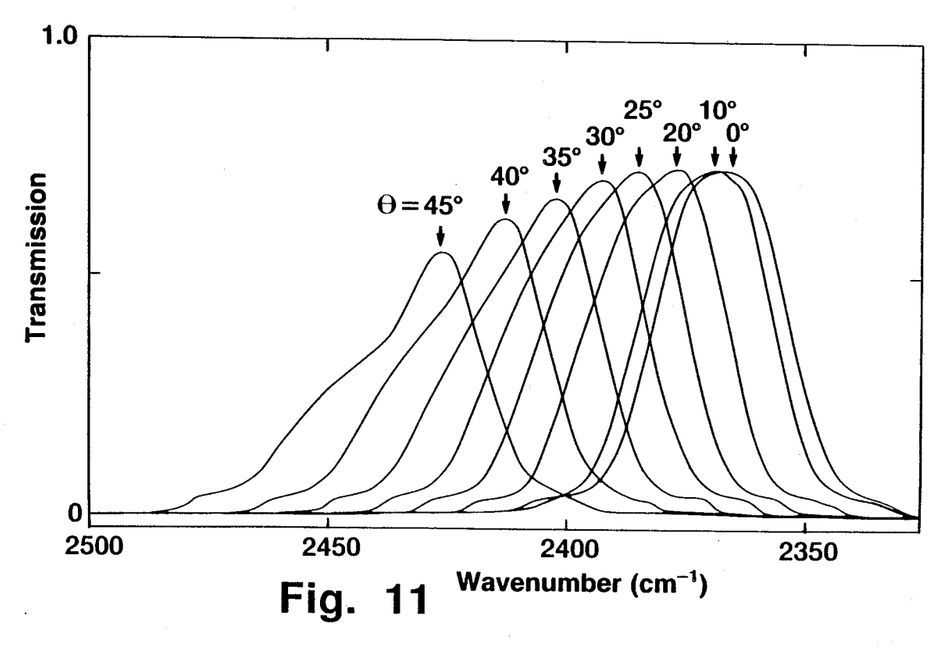
FIG. 11 shows the transmission curves for a certain infrared bandpass filter at various angular positions.

FIG. 11 represents transmission curves for a representative filter for angular positions ranging from 0 to 45 degrees. The curve for 35 degrees is suitable for transmitting the spectral lines of $CO_2$. Since there are no observable lines of carbon dioxide beyond 2400 cm$^{-1}$, transmission of the filter in this region will not present a problem.

Figure 10:
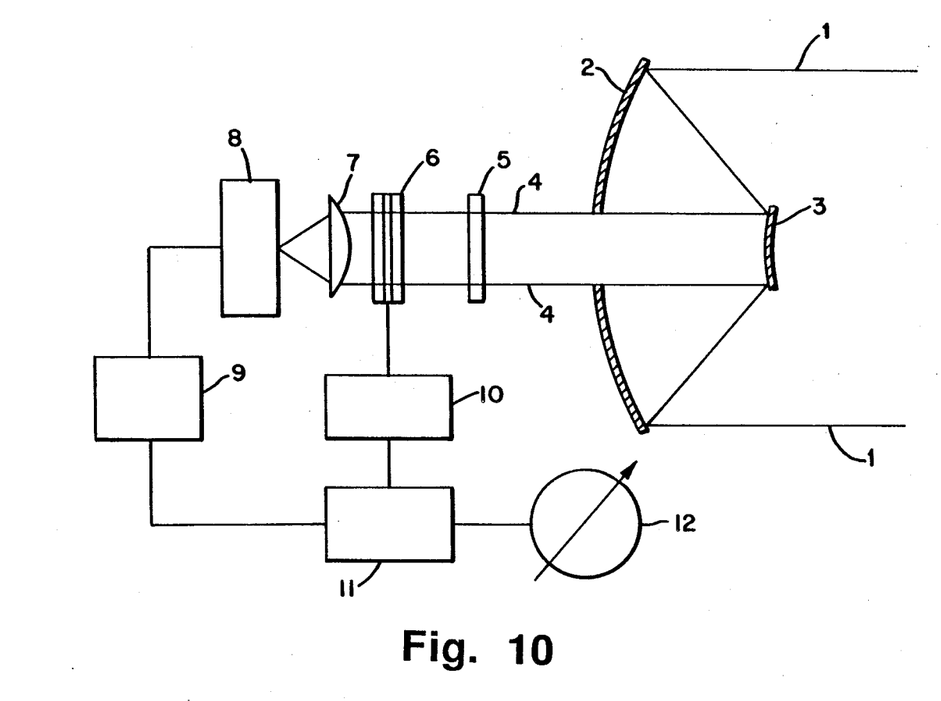
FIG. 10 is a schematic diagram of the invention apparatus for remotely sensing atmospheric air temperature profiles.

The filtered beam passes next to a Fabry-Perot etalon (6), which is tunable in the spectral region between 2381 and 2395 cm$^{-1}$ by means of scanner control (10). Fabry-Perot etalons of this type are commercially available from Burleigh Instruments, Inc., Fishers, N.Y. Their Model TL38IRIR2.3 Fabry-Perot etalon is a suitable instrument for present purposes. This Fabry-Perot etalon is tuned by applying a high voltage signal to a piezoelectric element attached to one of the Fabry-Perot mirrors. A Burleigh Instrument's Model RC-44 Programmable Ramp Generator can be used to generate this high voltage signal to provide sweep of predetermined wavelength.

An alternative form of a tunable Fabry-Perot etalon consists of a solid etalon constructed of a suitable infrared transmitting material such as sapphire. The solid etalon is tuned by changing its angular position relative to the incident radiation.

The infrared radiation of the selected wavelength which passes through the Fabry-Perot etalon 6 is focussed by means of a lens (7) onto detector (8). Lens (7) is constructed of sapphire or some other infrared transmitting material. Infrared detector (8) is suitably an indium antimonide infrared detector. A suitable detector is commercially available from EG&G Judson, Montgomeryville, Pa., under the designation Model JIOD-M204-R02M Indium Antimonide Detector. This detector has a 2 mm diameter active element that can be cooled to 77 K. by means of a liquid nitrogen dewar. The signal output from the infrared detector is passed to a low noise preamplifier (9), thence to a signal processing means (11), which is connected to a suitable display/alarm device (12). The above described electronic apparatus is of conventional construction and function.

In operation, the Fabry-Perot etalon is sequentially tuned by means of scanner control (10) to chosen preselected frequencies within the 4.17 to 4.2 μm region of the $CO_2$ spectral emission band, and the corresponding infrared detector readings are recorded and compared to obtain information on range temperature discontinuities.

The ability to obtain range information using the radiometer depends upon the measurement of the emission from the individual $CO_2$ spectral lines (see FIG. 2). These lines fall in the spectral region between 2381 cm$^{-1}$ to 2395 cm$^{-1}$. The spacing of adjacent lines in the region near 2381 cm$^{-1}$ is about 0.89 cm$^{-1}$. This spacing, which decreases gradually as the line emission falls, is about 0.49 cm$^{-1}$ at 2393 cm$^{-1}$. The spectral width of the individual emission lines is about 0.15 cm$^{-1}$.

As previously stated, a Fabry-Perot interferometer (etalon) can suitably be used as a tunable spectral filter to detect the emission from the individual $CO_2$ lines. The free spectral range of the interferometer is equal to the frequency separation between adjacent transmission windows and it is given by the equation $$\Delta\omega = (2nd)^{-1} \qquad (1)$$

where nd is the optical path length (in cm) between the interferometer mirrors and n represents the refractive index. The reflectivity finesse F of the interferometer is defined as the ratio of the free spectral range to the width of a single transmission window, i.e., $$F_R = \frac{\Delta\omega}{\delta} = \frac{\pi\sqrt{R}}{1-R} \qquad (2)$$

where R is the reflectivity of the interferometer mirrors. For a free spectral range equal to the width of the region containing the $CO_2$ emission lines, namely 2395−2381=14 cm$^{-1}$ and the spectral width of the interferometer transmission window equal to the $CO_2$ emission linewidth (ca. 0.15 cm$^{-1}$), then the required reflectivity finesse of the interferometer is $$F_R = \frac{14 \text{ cm}^{-1}}{0.15 \text{ cm}^{-1}} = 93. \qquad (3)$$

From Eq. 2 the mirror reflectivity required to yield a finesse of 93 is about 97%. The mirror spacing (in air) requiring to give a free spectral range of 14 cm$^{-1}$ is 0.36 mm (0.014"). These specifications for the interferometer are easily met by commercially available tunable Fabry-Perot etalons.

Since various changes may be made in the invention without departing from its spirit and essential characteristics, it is intended that all matter contained in the description shall be interpreted as illustrative only and not in a limiting sense, the scope of the invention being defined by the appended claims.

I claim:
1. Apparatus for remotely sensing changes in the spatial temperature profile of a column of atmospheric air comprising, in combination:
   (a) collecting means for receiving the thermal radiation from a column of atmospheric air, and for directing it to intensity sensing means;
   (b) intensity sensing means comprising means for sequentially sensing the intensity in said column of atmospheric air of at least two spectral peaks in the 4.17 to 4.2 μm region of the $CO_2$ spectral emission band; and
   (c) means for detecting temporal changes in the relative intensity of said spectral peaks.
2. The apparatus of claim 1 wherein said intensity sensing means includes a frequency tunable Fabry-Perot etalon.
3. The apparatus of claim 2 wherein said intensity sensing means further comprises a blocking filter in combination with said tunable Fabry-Perot etalon for selectively passing infrared radiation including the carbon dioxide band in the 4.17 to 4.2 μm region.
4. The apparatus of claim 3 further comprising scanner control means associated with said Fabry-Perot etalon for sequentially scanning selected peaks within the 4.17 to 4.2 μm region of the CO₂ spectral emission band.

5. The apparatus of claim 4 wherein said means for detecting temporal changes in the relative intensity of said spectral peaks further comprises signal processing and display means to provide an indication of sensed changes in the temperature profile of the column of atmospheric air.

6. The apparatus of claim 1 wherein said intensity sensing means comprises, in combination, a blocking filter for selectively passing infrared radiation including the carbon dioxide band in the 4.17 to 4.2 μm region; a frequency tunable Fabry-Perot etalon with associated scanner control means for sequentially scanning selected peaks within the 4.17 to 4.2 μm region of the CO₂ spectral emission band transmitted through said blocking filter; infrared radiation detector means for sensing the intensity of the infrared radiation passing through said Fabry-Perot etalon; and focusing means for directing said passing infrared radiation onto said radiation detector.

7. The apparatus of claim 6 wherein said means for detecting temporal changes in the relative intensity of said spectral peaks further comprises signal processing and display means to provide an indication of sensed changes in the temperature profile of the column of atmospheric air.

8. The method for remotely sensing changes in the spatial temperature profile of a column of atmospheric air comprising, in combination:
 (a) repeatedly sensing the intensity of the thermal radiation from said column of atmospheric air in at least two spectral peaks in the 4.17 to 4.2 μm region of the CO₂ spectral emission band; and
 (b) comparing the relative intensity of said spectral peaks over time.

9. The method of claim 8 wherein said spectral peaks are located at opposite ends of the 4.17 to 4.2 μm region for the CO₂ spectral emission band.

10. The method of claim 8 further comprising the step of displaying changes over time of the sensed differences in the relative intensity of said spectral peaks.

* * * * *

UNITED STATES PATENT AND TRADEMARK OFFICE
CERTIFICATE OF CORRECTION

PATENT NO. : 4,937,447

DATED : June 26, 1990

INVENTOR(S) : Joseph J. Barrett

It is certified that error appears in the above-identified patent and that said Letters Patent is hereby corrected as shown below:

In the drawings, Fig. 9, change the legend on the right hand margin (to the right of the graph) as shown on the attached page.

| From | | To | |
|---|---|---|---|
| + − | 15K | ○ | +15K |
| △ − | 9K | △ + | 9K |
| ○ | 0k | ◇ | 0K |
| ▽ + | 9K | + − | 9K |
| ☐ + | 15K | ☐ | −15K |

Signed and Sealed this

Eighth Day of March, 1994

Attest:

BRUCE LEHMAN

*Attesting Officer*        *Commissioner of Patents and Trademarks*

Fig. 9